US011942740B2

(12) United States Patent
Umehara et al.

(10) Patent No.: US 11,942,740 B2
(45) Date of Patent: Mar. 26, 2024

(54) MOTOR HAVING COLUMNAR BRUSH

(71) Applicant: MINEBEA MITSUMI INC., Nagano (JP)

(72) Inventors: Mikio Umehara, Yonago (JP); Atsushi Omura, Matsue (JP); Kazuaki Sato, Yonago (JP)

(73) Assignee: Minebea Mitsumi Inc., Kitasaku-gun (JP)

( * ) Notice: Subject to any disclaimer, the term of this patent is extended or adjusted under 35 U.S.C. 154(b) by 239 days.

(21) Appl. No.: 17/339,469

(22) Filed: Jun. 4, 2021

(65) Prior Publication Data

US 2021/0296835 A1    Sep. 23, 2021

Related U.S. Application Data

(62) Division of application No. 16/417,053, filed on May 20, 2019, now Pat. No. 11,063,400.

(30) Foreign Application Priority Data

May 22, 2018  (JP) .................................. 2018-098243

(51) Int. Cl.
*H01R 39/38* (2006.01)
*H02K 5/14* (2006.01)
(Continued)

(52) U.S. Cl.
CPC ............. *H01R 39/38* (2013.01); *H02K 5/145* (2013.01); *H02K 5/225* (2013.01); *H02K 13/10* (2013.01)

(58) Field of Classification Search
CPC .... H01R 39/38; H01R 39/383; H01R 39/381; H02K 5/145; H02K 5/225; H02K 13/10; H02K 23/04; H02K 5/14; H02K 13/006
(Continued)

(56) References Cited

U.S. PATENT DOCUMENTS

| 1,372,446 A | 3/1921 | Munz |
| 2,842,692 A | 7/1958 | Johnson et al. |

(Continued)

FOREIGN PATENT DOCUMENTS

| JP | S58-141644 A | 8/1983 |
| JP | 2001-231222 A | 8/2001 |

(Continued)

OTHER PUBLICATIONS

Office Action dated Mar. 15, 2022 issued in the corresponding Japanese Patent Application No. 2018-098243 with the English translation thereof.
(Continued)

*Primary Examiner* — John K Kim
(74) *Attorney, Agent, or Firm* — Shende & Associates P.C.; Fulchand P. Shende; Joseph P. Carrier

(57) ABSTRACT

A motor includes a frame having an outer diameter of 10 millimeters or less and an inner surface. The motor also includes an annular magnet attached to the inner surface of the frame, a bracket provided at the frame, and a columnar brush formed of carbon and having an outer peripheral surface. In addition, the motor includes a commutator contacting the outer peripheral surface of the brush, and an elastic member supporting the brush at the bracket. A part of the elastic member is disposed inside of the columnar brush.

11 Claims, 12 Drawing Sheets

(51) Int. Cl.
*H02K 5/22* (2006.01)
*H02K 13/10* (2006.01)

(58) Field of Classification Search
USPC .......................................................... 310/239
See application file for complete search history.

(56) References Cited

U.S. PATENT DOCUMENTS

| | | | |
|---|---|---|---|
| 3,433,989 A | 3/1969 | Leavitt | |
| 3,445,692 A | 5/1969 | Kato | |
| 4,559,465 A | 12/1985 | Gagneux | |
| 4,574,215 A | 3/1986 | Mabuchi | |
| 4,746,829 A | 5/1988 | Strobl | |
| 4,893,043 A | 1/1990 | Baines | |
| 5,204,569 A | 4/1993 | Hino et al. | |
| 6,081,055 A | 6/2000 | Narusawa | |
| 6,603,235 B1 | 8/2003 | Kimura | |
| 6,628,025 B2 | 9/2003 | Ibata et al. | |
| 7,525,225 B2 | 4/2009 | Uchiumi et al. | |
| 8,334,627 B2 | 12/2012 | Koyanagi | |
| 11,063,400 B2* | 7/2021 | Umehara | H01R 39/383 |
| 11,632,012 B2* | 4/2023 | Ohba | H02K 5/22 |
| | | | 310/71 |
| 2003/0048027 A1* | 3/2003 | Miyamoto | H02K 5/145 |
| | | | 310/240 |
| 2003/0155836 A1 | 8/2003 | Uda et al. | |
| 2004/0061412 A1* | 4/2004 | Ozawa | H01R 39/381 |
| | | | 310/239 |
| 2004/0169426 A1 | 9/2004 | Segawa | |
| 2007/0085495 A1 | 4/2007 | Suzuki et al. | |
| 2008/0030095 A1* | 2/2008 | Iizuka | H02K 1/17 |
| | | | 310/156.43 |
| 2009/0152978 A1 | 6/2009 | Fournier et al. | |
| 2011/0291510 A1 | 12/2011 | Hara | |
| 2015/0042214 A1 | 2/2015 | Osborne et al. | |
| 2015/0076936 A1 | 3/2015 | Osborne et al. | |
| 2018/0069448 A1 | 3/2018 | Hirabayashi et al. | |
| 2019/0363499 A1* | 11/2019 | Umehara | H02K 5/225 |
| 2021/0296835 A1* | 9/2021 | Umehara | H02K 5/145 |

FOREIGN PATENT DOCUMENTS

| | | |
|---|---|---|
| JP | 2007-006633 A | 1/2007 |
| JP | 2008-136294 A | 6/2008 |
| JP | 2008-259341 A | 10/2008 |
| JP | 2014-011868 A | 1/2014 |
| JP | 2014-050221 A | 3/2014 |
| JP | 2018-038231 A | 3/2018 |

OTHER PUBLICATIONS

Office Action dated Aug. 30, 2022 in the corresponding Japanese Patent Application No. 2018-098243 with the English translation thereof.

* cited by examiner

MOTOR HAVING COLUMNAR BRUSH

CROSS-REFERENCE TO RELATED APPLICATIONS

This application is a divisional of, and claims priority from U.S. application Ser. No. 16/417,053, filed May 20, 2019. The present application also claims priority from Japanese Patent Application No. 2018-098243 filed on May 22, 2018. The entire contents of each of the referenced priority applications are incorporated herein by reference.

TECHNICAL FIELD

The present disclosure relates to a motor, and more particularly to a motor having a brush.

BACKGROUND

Various configurations have been proposed for a motor having a brush.

JP-A-2001-231222 describes a configuration of a motor in which a space for dispersing abrasion powder of a brush produced by sliding with a commutator is provided between brush holders adjacent to each other, and between the brush holders and a housing. JP-A-2001-231222 aims to prevent electric leakage caused by the abrasion powder of the brush which is accumulated between the commutators.

In recent years, a motor is required to be reduced in size in applications requiring high torque. In a small-sized motor, in order to output a drive force for the high torque, it is necessary to supply a large current to the motor. On the other hand, in the small-sized motor, since an interval between the adjacent commutators is relatively narrow, there is a problem that a short circuit tends to occur due to the accumulation of the abrasion powder of the brush between the adjacent commutators. In addition, for a small-sized motor in where a width of a frame is 10 millimeters or less, it is difficult to use a structure using a brush having a relatively large size as described in JP-A-2001-231222.

SUMMARY

The present disclosure aims to solving the above-described problems, and an object thereof is to provide a motor having a small size and a relatively long life.

To achieve the above-described object, according to an aspect of the present invention, there is provided a motor including: a frame having a width of 10 millimeters or less and an inner surface; an annular magnet attached to the inner surface of the frame; a bracket provided at the frame; a columnar brush formed of carbon and having an outer peripheral surface; a commutator contacting with the outer peripheral surface of the brush; and an elastic member supporting the brush to the bracket, in which at least a part of the elastic member is inside the brush.

According to another aspect of the present disclosure, there is provided a motor including: a frame including an inner surface; a plurality of magnets attached to the inner surface of the frame; a bracket provided at the frame; a columnar brush formed with carbon and including an outer peripheral surface; a commutator contacting with the outer peripheral surface of the brush; and an elastic member supporting the brush to the bracket, in which the plurality of magnets are lined in a peripheral direction, and at least a part of the elastic member is inside the brush.

According to another aspect of the present disclosure, there is provided a motor including: a frame having an inner surface; a magnet attached to the inner surface of the frame; a bracket provided at the frame; a plurality of columnar brushes formed with carbon, each of the brushes including an outer peripheral surface; a commutator contacting with at least one outer peripheral surface of the brushes; and plurality of elastic member supporting the brushes to the bracket, in which parts of the elastic members are inside the plurality of brush, and a position of one of the brushes is higher than a position of other brush of the brushes in a rotation axis direction of the motor.

DETAILED DESCRIPTION

Hereinafter, a motor according to one embodiment of the present disclosure will be described.

In the following description, a direction parallel to a rotation axis of the motor may be referred to as a rotation axis direction of the motor. Further, the rotation axis direction may be referred to as a front-rear direction (a direction in which the bracket is provided as viewed from a frame of the motor is a rear direction). In addition, a specific direction (specifically, described later) in a direction (a radial direction) perpendicular to the rotation axis of the motor may be referred to as an upper-lower direction, and a direction perpendicular to the front-rear direction and the upper-lower direction may be referred to as a left-right direction. The terms "front-rear", "upper-lower", "right-left", or the like are used herein for convenience in a case where only the motor is focused on, and are not intended to limit a direction of a device on which the motor is mounted or a posture in which the motor is used.

Embodiment

Figure 1:
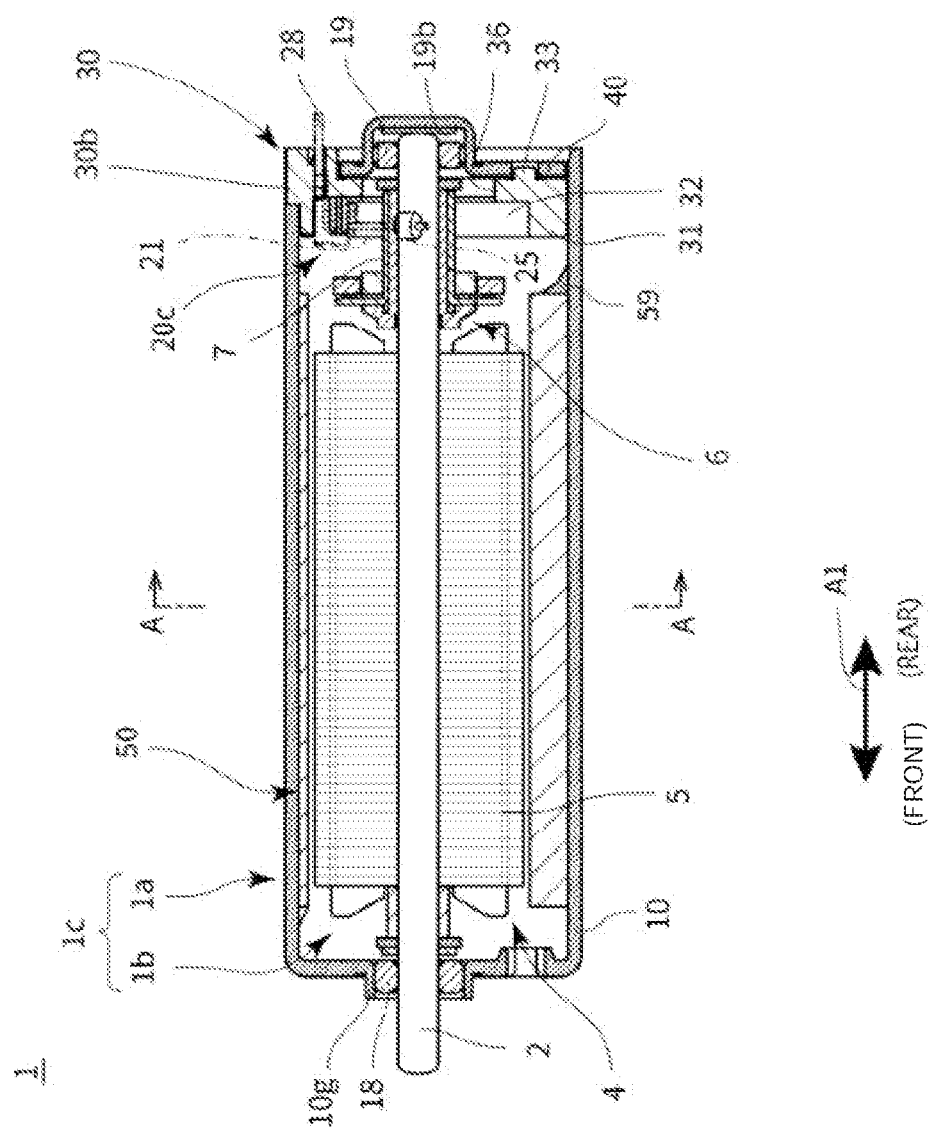
FIG. 1 is a sectional view showing a motor according to one embodiment of the present disclosure.
Figure 2:
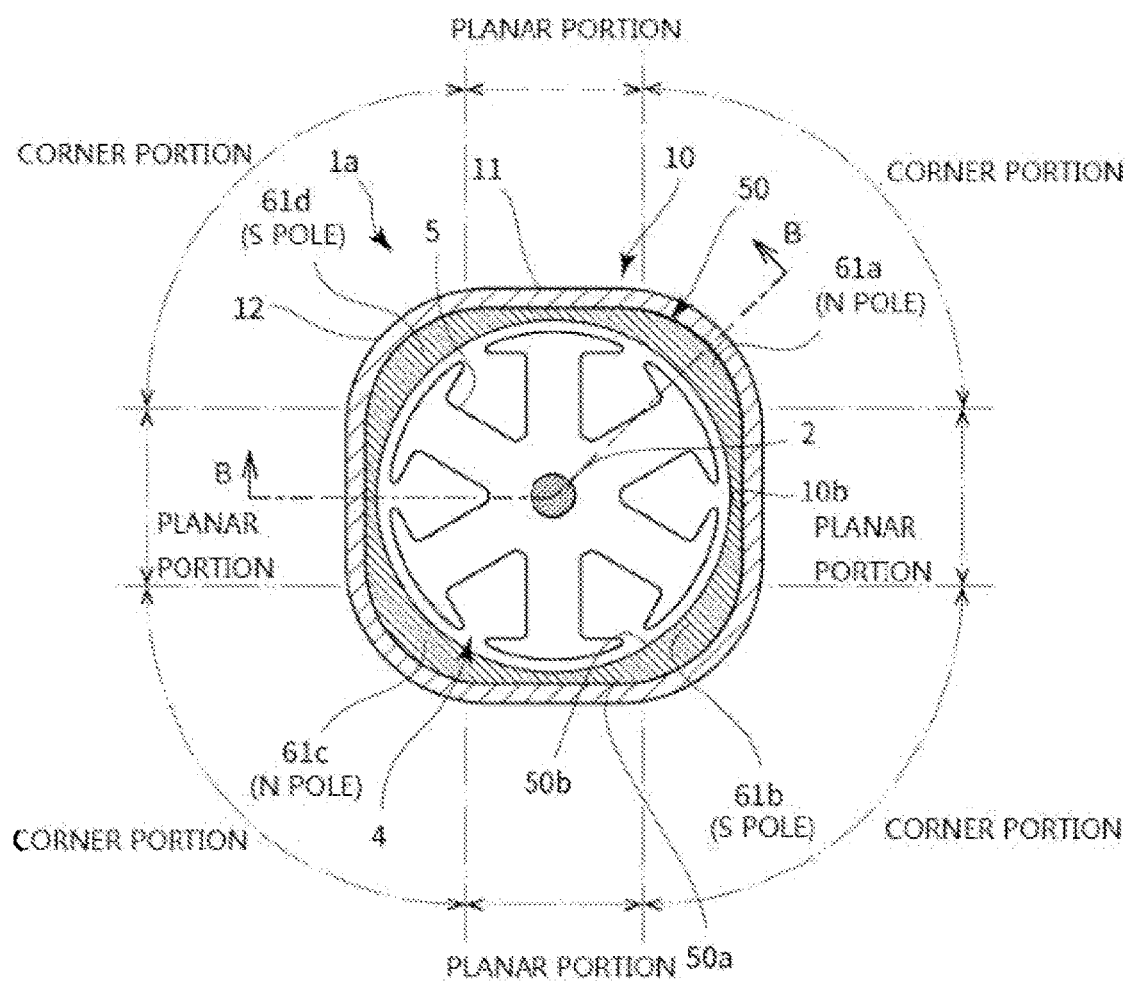
FIG. 2 is a view schematically showing a cross section taken along a line A-A in FIG. 1.
Figure 2:
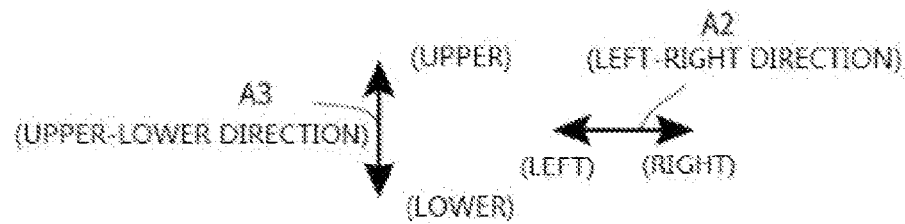

FIG. 1 is a sectional view showing a motor according to one embodiment of the present disclosure. FIG. 2 is a view schematically showing a cross section taken along a line A-A in FIG. 1.

A cross section shown in FIG. 1 is a cross section taken along a line B-B in FIG. 2. Here, some constituent members are schematically shown (for example, a brush unit 20c which will be described later is indicated by a two-dot chain line). In the following drawings, an arrow A1 indicates a rotation axis direction, that is, the front-rear direction. An arrow A2 indicates the left-right direction (in FIG. 2, left indicates a left direction). An arrow A3 indicates the upper-lower direction (in FIG. 2, upper indicates an upper direction).

A motor 1 includes a frame assembly 1a and an armature assembly 1b rotatable with respect to the frame assembly 1a. The motor 1 is a small-sized motor having a width of 10 millimeters or less. Here, the width of the motor 1 may be, for example, a distance between a pair of planar portions 11 facing each other across a rotation axis 2, a dimension in the upper-lower direction or the left-right direction of the motor 1, or a maximum outer diameter of the motor 1.

The armature assembly 1b includes the rotation axis (shaft 2), an armature 4 attached to the rotation axis 2, and a commutator 6 attached to the rotation axis 2, for example. The armature 4 is attached to the rotation axis 2. The armature 4 includes an armature core 5 having a plurality of salient poles protruding in a radial direction, a winding (not shown) wound around each of the salient poles, for example. The commutator 6 is provided near one end portion of the rotation axis 2. The commutator 6 includes a plurality of commutator segments 7 lined in a circumferential direction. Each of the plurality of commutator segments 7 is electrically connected to the winding.

The frame assembly 1a includes a frame (motor case) 10, a bracket 30, a plate 40, and a magnet 50, for example.

The frame 10 includes amend portion in a front side, an end portion in a rear side, a surface (cap) closing the end portion in the front side, and a tubular portion. That is, in the frame 10, the end portion in the rear side has a cup shape serving as an opening portion. The opening portion on the end portion in the rear side of the frame 10 (a right end portion in FIG. 1) is blocked by the plate 40. The armature 4, the commutator 6, or the like of the armature assembly 1b are accommodated in a housing configured by the frame 10 and the plate 40.

The frame 10 is formed using a magnetic material. As shown in FIG. 2, the frame 10 includes a plurality of corner portions 12 and the planar portions 11. Each of the planar portions 11 is disposed between two adjacent corner portions 12. Specifically, the frame 10 has an outer shape having four planar portions 11 and four corner portions 12. The two planar portions 11 adjacent in the peripheral direction are connected to each other via one corner portion 12. One of the two planar portions 11 adjacent in the peripheral direction is substantially perpendicular to the other. The corner portion 12 has a rounded shape (R shape). The frame 10 has a substantially square cross section perpendicular to the rotation axis 2. The frame 10 is formed in a square shape as a whole. That is, the motor 1 is a square small-sized motor. Incidentally, in the following description, the upper-lower direction is a direction perpendicular to one pair of planar portions 11 positioned so as to interpose the rotation axis 2, and the left-right direction is a direction perpendicular to the other pair of planar portions 11 positioned so as to interpose the rotation axis 2.

Returning to FIG. 1, the bracket 30 is disposed at an inner side of the plate 40. The bracket 30 is provided at the frame 10. Two brush units 20b, 20c (hereinafter, sometimes referred to as a brush unit 20 without distinguishing between the two brush units 20b, 20c) are attached to the bracket 30. Each brush unit 20 includes a brush 25 having an outer surface and comes into contact with the commutator 6, a terminal portion 28 to which a current is externally supplied, and a metal support portion (an example of an elastic member) 21 which electrically connects the brush 25 and the terminal portion 28. The terminal portion 28 is attached to the bracket 30. That is, the support portion 21 supports the brush 25 to the bracket 30. The support portion 21 is formed of an elastic member having elasticity, and holds the brush 25 to the bracket in a state where the commutator 6 comes into contact with the outer surface of the brush 25.

The rotation axis 2 penetrates through a front surface of the frame 10. That is, an end portion in a front side of the rotation axis 2 protrudes from the frame 10 to the outside of the frame 10, and another portion of the rotation axis 2 is housed inside the frame 10. A bearing holding portion 10g is provided at a central portion of the front surface of the frame 10, and a bearing 18 is held in the bearing holding portion 10g. In addition, a bearing 19 is held on a central portion of the plate 40. A thrust washer 19b is disposed behind the bearing 19. The rotation axis 2 is rotatably supported with respect to the frame 10 by the bearings 18, 19 at two positions and the thrust washer 19b.

As shown in FIG. 2, in the present embodiment, one annular magnet 50 is provided. In other words, the magnet 50 is formed in a tubular shape. The magnet 50 is disposed inside the frame 10. The frame assembly 1a has a cross-sectional structure in which an outer peripheral surface 50a of the magnet 50 is surrounded by the frame 10. An outer peripheral surface of the frame 10 is an outer peripheral surface of the motor 1. Here, a plurality of magnets each having a magnetic pole element may be used.

The frame 10 has a substantially uniform thickness. That is, an inner surface 10b of the frame 10 is formed by connecting a plurality of flat portions by the planar portions 11 and rounded portions by the corner portions 12, and is formed in a square shape.

The magnet 50 is a bonded magnet formed by using a known rare earth material and a known resin material, for example. Here, the magnet 50 is not limited to the bonded magnet, and may be, for example, a sintered magnet.

The magnet 50 includes a magnetic pole element 61 (N pole 61a, S pole 61b, N pole 61c, and S pole 61d). That is, the magnet 50 includes the same number of the magnetic pole elements 61 as the number of the corner portions 12 of the motor 1. The magnetic pole elements 61 are disposed such that polarities are alternately disposed in the peripheral direction. The four magnetic pole elements 61 are disposed at the four corner portions 12 of the frame 10 such that the magnetic pole elements 61 face each other.

The magnet 50 has the outer peripheral surface 50a having a rounded shape along the inner surface 10b of the frame 10 at each of the corner portions 12. In addition, the magnet 50 has an inner peripheral surface 50b having a cylindrical surface shape. An air gap is slightly provided between the inner peripheral surface 50b of the magnet 50 and the armature core 5.

In the present embodiment, the magnet 50 is fixed to the frame 10 by using an adhesive 59. That is, the adhesive 59 is applied between an end portion in a rear side of the magnet 50 and the inner surface 10b of the frame 10. In an assembling process of the motor 1, the magnet 50 is accommodated from the opening portion on a rear side of the frame 10 to an inside of the frame 10. Further, the adhesive 59 is applied between the end portion in a rear side of the magnet 50 and the inner surface 10b of the frame 10, so that the magnet 50 is fixed to the frame 10. Thereafter, the armature assembly 1b is attached to the frame 10, and the bracket 30 and the plate 40 are attached to the frame 10, so that the motor 1 is assembled.

Figure 3:
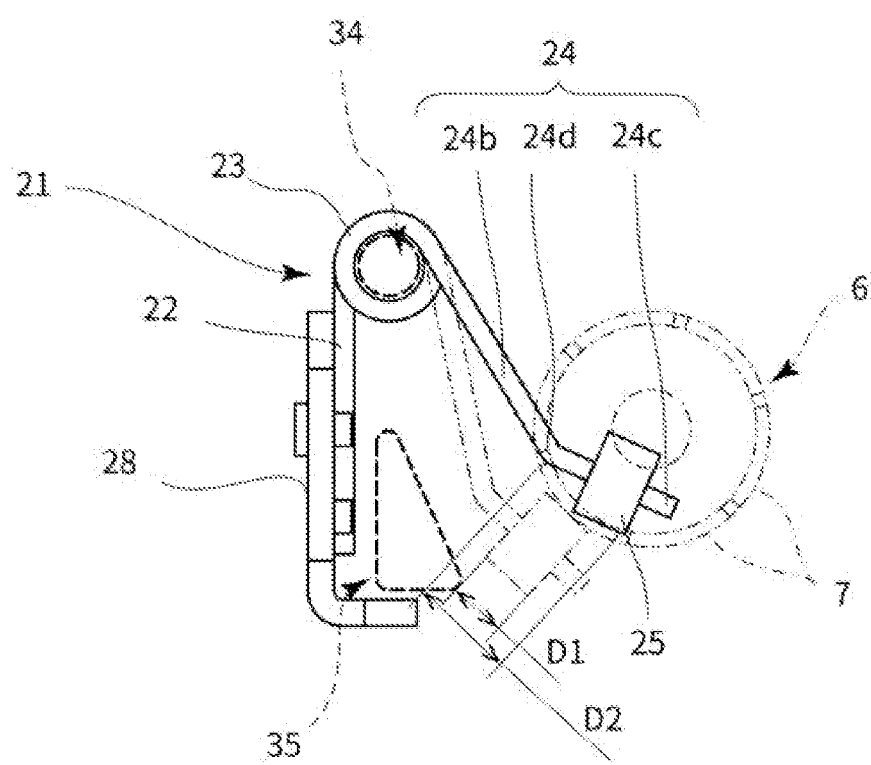
FIG. 3 is a front view of a brush unit.
Figure 4:
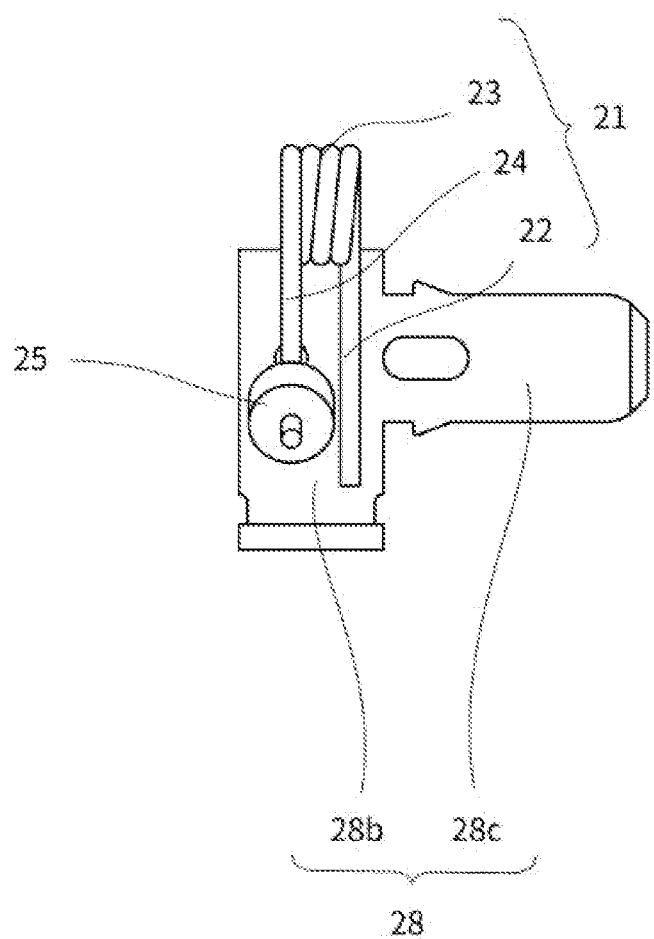
FIG. 4 is a side view of the brush unit.

FIG. 3 is a front view of the brush unit 20b. FIG. 4 is a side view of the brush unit 20b.

FIG. 3 shows a view of the brush unit 20b viewed from the front, and FIG. 4 shows a view of the brush unit 20b viewed from the right. In the two brush units 20b, 20c, the brush unit 20b is disposed on a left side of the motor 1, and the brush unit 20c is disposed on a right side of the motor 1. The brush unit 20c on the left side is symmetrical with the brush unit 20b on the right side.

As shown in FIGS. 3 and 4, the brush unit 20b is configured by respectively connecting the brush 25 and the terminal portion 28 to the support portion 21.

In the present embodiment, the support portion 21 is formed by molding a single metal wire. The support portion 21 includes a first extending portion 22 extending toward the terminal portion 28, a coil portion 23, and a second extending portion 24 extending toward the coil portion 23. The first extending portion 22 is fixed to the terminal portion 28 by welding, soldering, for example. The coil portion 23 is provided between the first extending portion 22 and the second extending portion 24. The coil portion 23 is formed by winding a metal wire in a coil shape. Since the coil portion 23 is provided, the second extending portion 24 can be displaced with respect to the first extending portion 22 while twisting the coil portion 23 around a central axis of the coil portion 23. That is, the support portion 21 is a torsion coil spring in which the second extending portion 24 is twisted with respect to the first extending portion 22. The central axis of the coil portion 23 is perpendicular to a paper surface in FIG. 3, and is parallel to the front-rear direction in the motor 1. Each of the first extending portion 22 and the second extending portion 24 extends in a direction perpendicular to the central axis of the coil portion 23.

The second extending portion 24 includes an intermediate portion 24b at a coil portion 23 side and an attachment portion 24c at a tip end side. A bent portion 24d positioned at an intermediate portion of the second extending portion 24 is interposed between the intermediate portion 24b and the attachment portion 24c. The intermediate portion 24b and the attachment portion 24c extend substantially linearly. The attachment portion 24c is bent at the bent portion 24d with respect to the intermediate portion 24b so that a tip end portion of the attachment portion 24c is apart from the first extending portion 22. In this way, since the second extending portion 24 has a bent structure, even in the small-sized motor 1, a length of an arm of the second extending portion 24 can be ensured to be longer, and the brush 25 can come into contact with the commutator 6 at an appropriate angle. The bent portion 24d is positioned within or on a circumference formed by the plurality of commutator segments 7 from a center of the commutator 6, in a state where the brush 25 does not come into contact with the commutator 6.

The brush 25 is a carbon brush formed of carbon. Since the brush 25 is made of carbon, the brush 25 is softer than a member forming the commutator 6. That is, the member forming the commutator 6 is harder than a member forming the brush 25. The brush 25 has a columnar shape. More specifically, the brush 25 has a cylindrical shape and has a cylindrical outer peripheral surface. The brush 25 is attached to the attachment portion 24c of the second extending portion 24. The attachment portion 24c penetrates through a central portion of the brush 25 in a height direction of the columnar brush 25. That is, at least a part of the support portion 21 is inside the brush 25 and further passes through the inside of the brush 25. Here, an end portion of the support portion 21 may not pass through the inside of the brush 25 and be disposed outside the brush 25, and may be, for example, inside the brush 25.

In FIG. 3, a two-dot chain line indicates the commutator 6 and the brush unit 20b in a state where the commutator 6 comes into contact with an outer peripheral surface of the brush 25. In the present embodiment, a height dimension (a dimension D1 in FIG. 3) of the columnar brush 25 is equal to or smaller than a peripheral dimension (a dimension D2 in FIG. 3) of the commutator segment 7 that comes into contact with the brush 25. That is, in the peripheral direction, a width (the dimension D1) of the outer peripheral surface of the brush 25 is equal to or smaller than a width (the dimension D2) of the commutator segment 7.

The terminal portion 28 is configured by, for example, a metal plate. The terminal portion 28 has a connection portion 28b to which the first extending portion 22 of the support portion 21 is connected, and a tip end portion 28c extending rearward from the connection portion 28b. The tip end portion 28c is provided with an engaging portion such as a pawl, a recess or a protrusion which engage with the bracket 30, for example. The tip end portion 28c is a portion protruding rearward from the plate 40 in the motor 1. By electrically connecting a lead wire and a connection terminal of an external device, for example, to the tip end portion 28c, electric power can be supplied to the motor 1.

The brush unit 20b is attached to the bracket 30 in a state where the terminal portion 28 passes through an attachment hole of the bracket 30. The brush unit 20b is disposed at the bracket 30 such that the tip end portion 28c is inserted into the attachment hole formed in the bracket 30 from the front of the bracket 30. By engaging the pawl, the recess, the protrusion, or the like provided at the tip end portion 28c with an engaged portion provided at the bracket 30, the terminal portion 28 is fixed to the bracket 30. Accordingly, the brush 25 is supported to the bracket 30 by the support portion 21.

When the brush unit 20b is attached to the bracket 30, a protruding portion 34 (indicated by a broken line in FIG. 3) formed on the bracket 30 is inserted into the inside of the coil portion 23. Since the coil portion 23 is twisted in a state where the central axis of the coil portion 23 is positioned by the protruding portion 34, a state where the outer peripheral surface of the brush 25 comes into contact with the commutator 6 is stably maintained.

Figure 5:
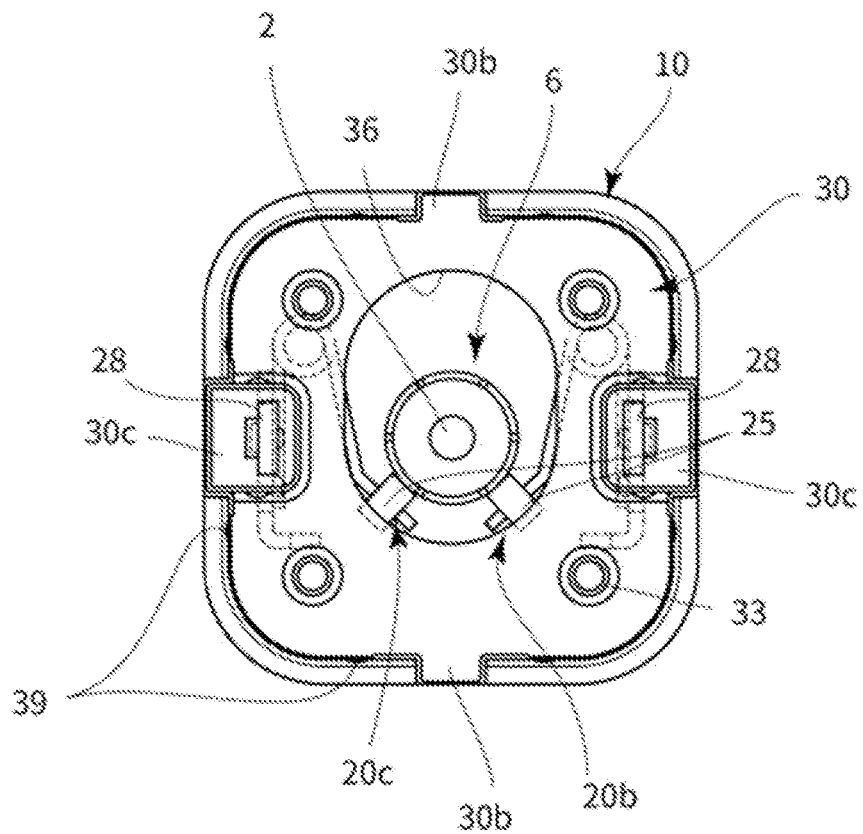
FIG. 5 is a rear view of the motor.
Figure 5:
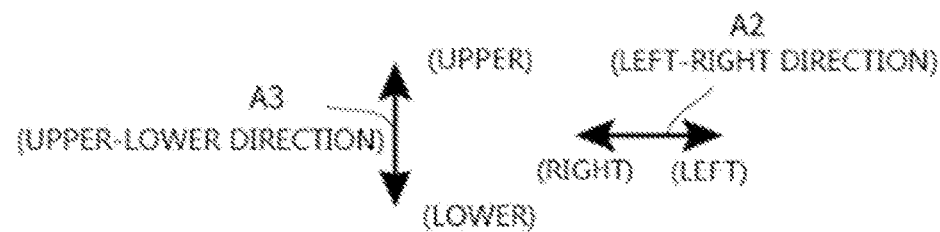
Figure 6:
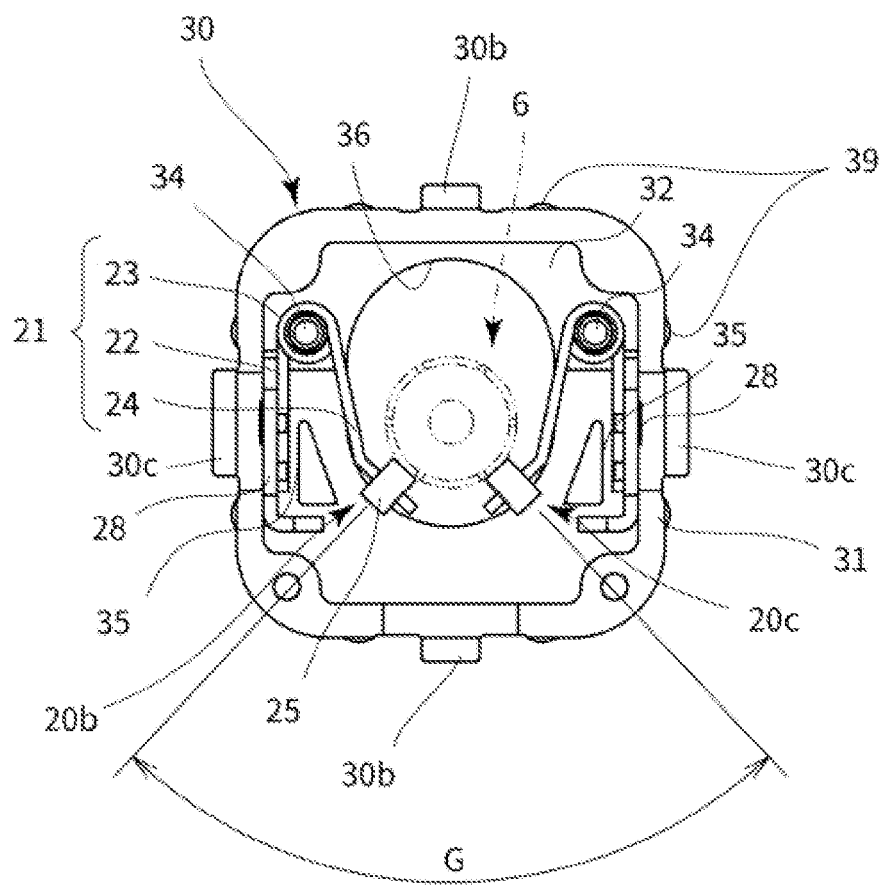
FIG. 6 is a front view showing a bracket to which the brush unit is attached.
Figure 6:
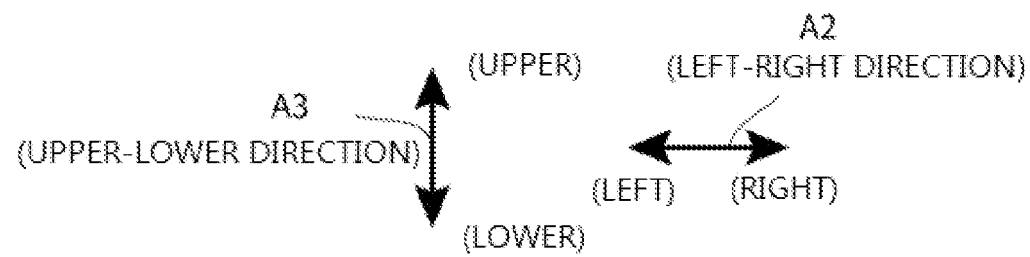

FIG. 5 is a rear view of the motor 1. FIG. 6 is a front view showing the bracket 30 to which the brush unit 20 is attached.

In FIG. 5, for the sake of explanation, the plate 40, the bearing 19, or the like are not shown. In FIG. 6, the brush unit 20 in a state where the commutator 6 is attached is shown, and a position of the commutator 6 is indicated by a two-dot chain line.

As shown in FIGS. 5 and 6, the bracket 30 is disposed so as to close the opening portion of the frame 10 of the motor 1. The bracket 30 has an outer peripheral portion 31 which is fitted inside the frame 10, and a recess 32 which is inside the outer peripheral portion 31 and recessed rearward. A rear side of the bracket 30 is closed by a plane perpendicular to the rotation axis direction, and an opening portion 36 through which the rotation axis 2 passes is formed in the plane.

The bracket 30 includes four protruding portions 33 which are formed on a rear surface, support portions 30c which are formed on the left and right of the rear side and respectively support the terminal portion 28, and protruding portions 30b which are provided at upper and lower portions of the outer peripheral portion 31 and respectively protruding in a radial direction. Each of the protruding portions 33 is disposed so as to penetrate the plate 40. In a state where the plate 40 is attached to the bracket 30, the plate 40 can be engaged with the bracket 30 by crushing end portions of the protruding portions 33. The tip end portions 28c of the left and right brush units 20 are respectively inserted into the support portions 30c from the front to the rear. The tip end portion 28c protrudes rearward from each of the support portions 30c. The protruding portions 30b fit into depressions formed in the end portion in a rear side of the frame 10. A position in the front-rear direction of the bracket 30 with respect to the frame 10 is determined by the protruding portions 30b and the frame 10.

Further, the recess 32 of the bracket 30 is provided with left and right protruding portions 34, and provided with wall portions 35 provided at inner sides of the terminal portions 28 of the left and right brush units 20, respectively. Each of the protruding portions 34 is, for example, a cylindrical protruding portion and protrudes forward from a bottom of the recess 32 (the rear surface of the bracket 30). The protruding portions 34 are fitted inside the coil portions 23 of the left and right brush units 20 to position the coil portions 23, respectively. Each of the wall portions 35 is a protruding portion protruding forward from the bottom of the recess 32, and has a surface facing an inner peripheral surface of the outer peripheral portion 31 across the terminal portion 28 and a surface facing the brush 25 of the brush unit 20, for example. Since each of the wall portions 35 is provided between the brush 25 attached to the second extending portion 24 and the terminal portion 28 to which the first extending portion 22 is attached, the support portion 21 is prevented from being greatly deformed and being damaged.

Figure 7:
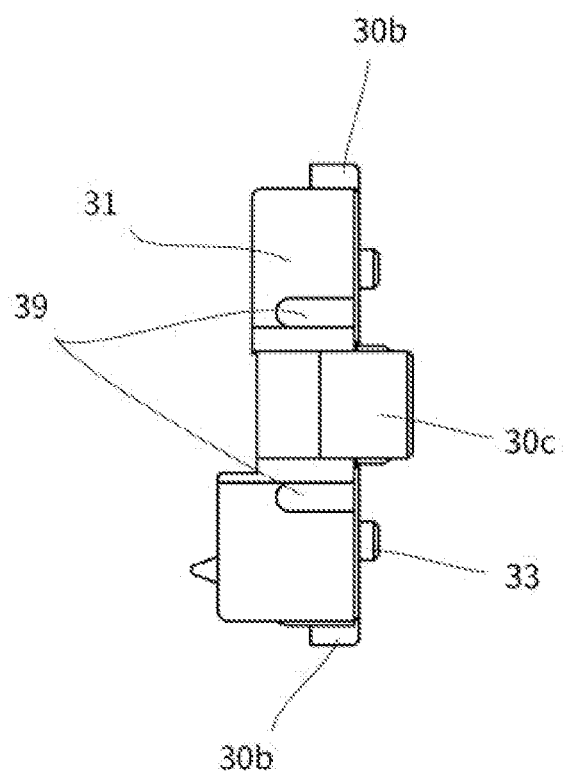
FIG. 7 is a side view of the bracket.
Figure 7:
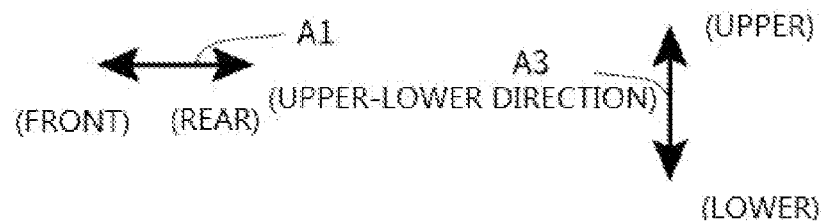

FIG. 7 is a side view of the bracket 30.

As shown in FIG. 7, ribs 39 are provided at an outer peripheral surface of the outer peripheral portion 31 of the bracket 30. Two ribs 39 are formed on each of an upper surface, a lower surface, a left side surface, and a right side surface in the outer peripheral surface of the outer peripheral portion 31. The ribs 39 protrude radially from the outer peripheral surface of the outer peripheral portion 31. Each of the ribs 39 has a long side in the front-rear direction. In the outer peripheral surface of the outer peripheral portion 31, the two ribs 39 are provided side by side in the peripheral direction on each of the upper surface, the lower surface, the left side surface, and the right side surface.

As shown in FIG. 5, each of the ribs 39 comes into contact with the inner surface of the frame 10. A stress is generated in the frame 10 by the contact of the rib 39. Therefore, abnormal noise due to propagation of vibration generated in the brush unit 20 to the frame 10 can be suppressed from being generated. In addition, the frame 10 is suppressed from vibrating for a relatively long time at a low frequency.

As shown in FIG. 5, in the present embodiment, a shape (planar shape) of an end edge portion of the opening portion 36 is a shape (oval shape or oblong shape) formed by connecting end portions of two semicircular arcs and two mutually parallel line segments having an identical length. In the present embodiment, a dimension in the upper-lower direction of the opening portion 36 is longer than a dimension in the left-right direction. That is, the opening portion 36 has the planar shape having a long side (upper-lower direction) and a short side (left-right direction).

The opening potion 36 faces the brushes 25 in the rotation axis direction. That is, the brushes 25 are also exposed to the rear side of the bracket 30 through the opening portion 36. As shown in FIG. 1, the commutator 6 is disposed at an inner side of the opening portion 36. Therefore, as shown in FIG. 5, a part of the opening portion 36 facing the brushes 25, the commutator 6, and other part of the opening portion 36 are disposed side by side from a lower side to an upper side of the opening portion 36. That is, at the inner side of the opening portion 36, the part of the opening portion 36 facing the brushes 25, the commutator 6, and the other part of the opening portion 36 are disposed side by side in the radial direction perpendicular to the rotation axis direction.

Since the opening portion 36 has the oval shape, the armature assembly 1b is accommodated inside the frame 10 as follows. Firstly, the armature assembly 1b is inserted into the inside of the frame 10. Then, the bracket 30 to which the brush units 20b, 20c are attached is attached to the end portion in a rear side of the frame 10 from behind the armature assembly 1b. At this time, the rotation axis 2 and the commutator 6 can adjust positions of the frame 10 and the armature assembly 1b with respect to the bracket 30 so that the commutator 6 comes into contact with the brushes 25, after passing through the upper portion of the opening portion 36 which does not face the brushes 25. Therefore, the motor 1 can be easily assembled.

In a state where the commutator 6 comes into contact with the two brushes 25, the two brushes 25 are positioned at a predetermined angle G in the peripheral direction of the rotation axis 2. For example, the angle G is about 90 degrees.

Figure 8:
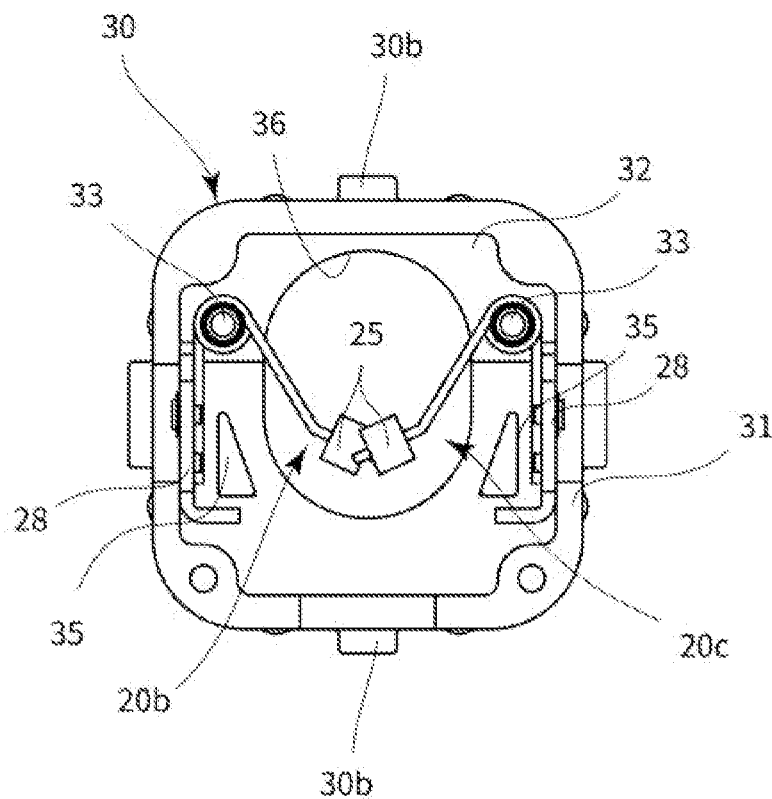
FIG. 8 is a view showing a first state of the bracket to which the brush unit is attached.
Figure 8:
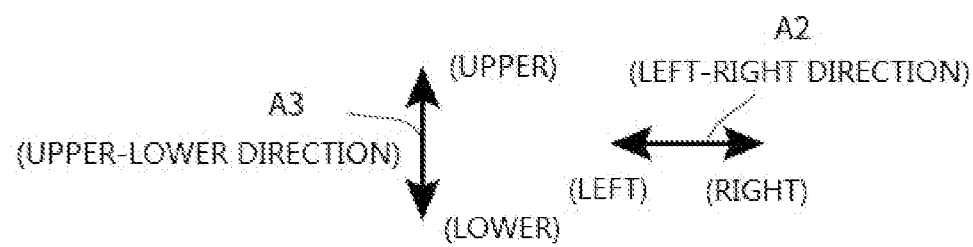
Figure 9:
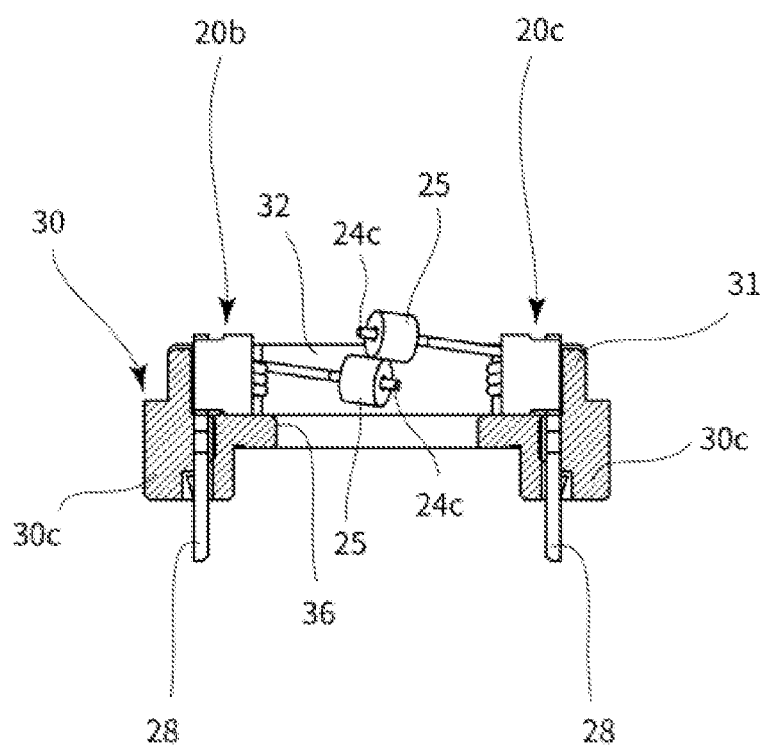
FIG. 9 is a sectional side view of FIG. 8.
Figure 9:
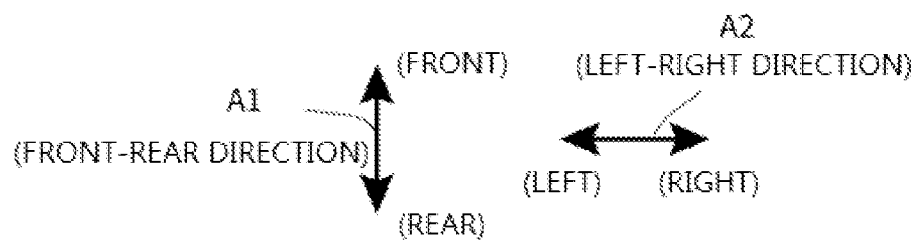
Figure 10:
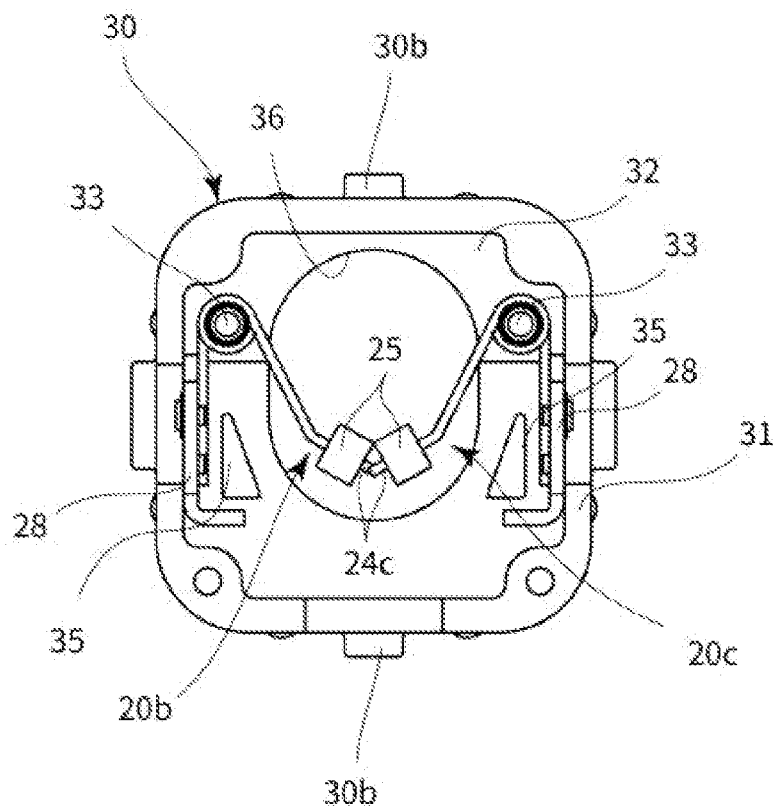
FIG. 10 is a view showing a second state of the bracket to which the brush unit is attached.
Figure 10:
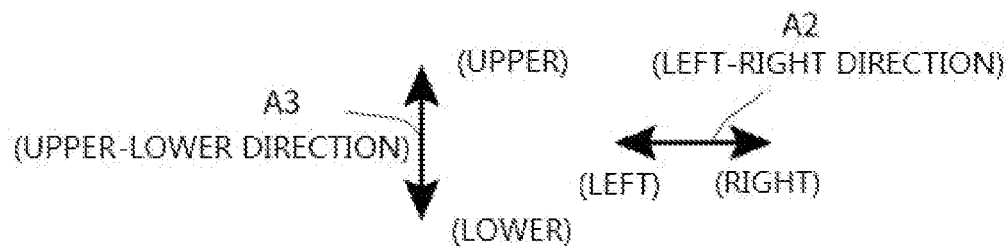
Figure 11:
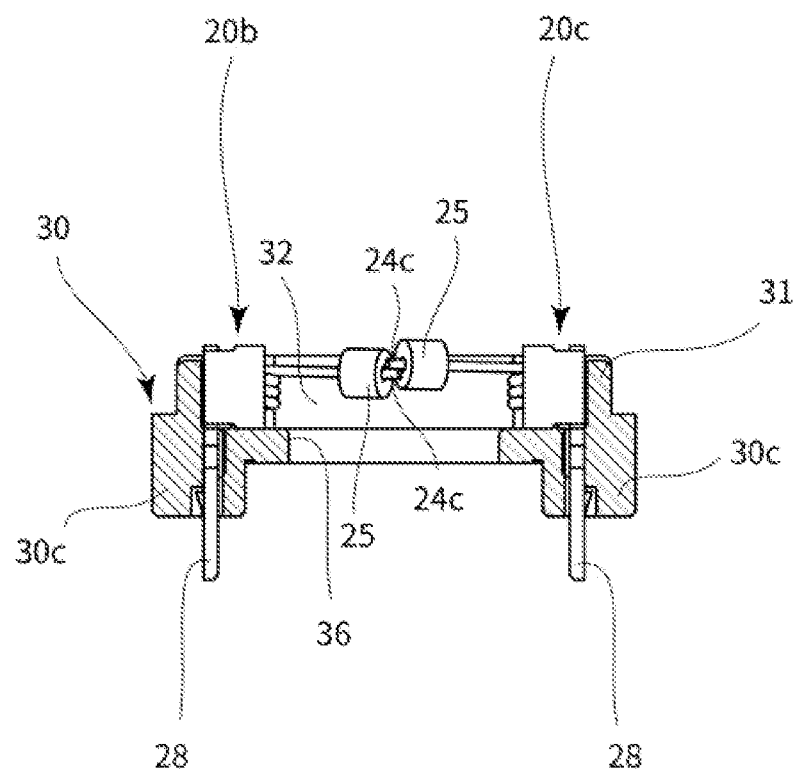
FIG. 11 is a sectional side view of FIG. 10.
Figure 11:
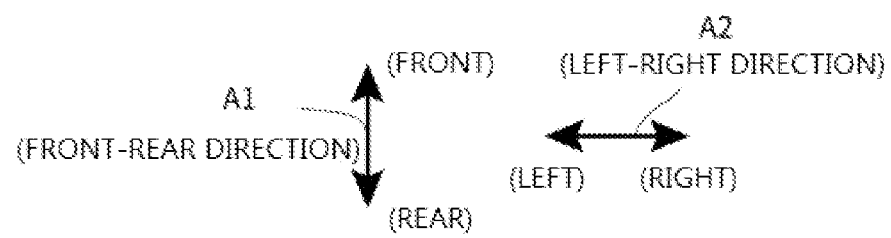

FIG. 8 is a view showing a first state of the bracket 30 to which the brush unit 20 is attached. FIG. 9 is a sectional side view of FIG. 8. FIG. 10 is a view showing a second state of the bracket 30 to which the brush unit 20 is attached. FIG. 11 is a sectional side view of FIG. 10.

In FIGS. 9 and 11, a cross section of the bracket 30 is shown, and the brush unit 20 is shown from a lower side rather than a cross section.

As shown in FIG. 8, in the present embodiment, one brush 25 of the two brush units 20b, 20c is configured to come into contact with the other brush 25. In addition, one support portion 21 of the two brush units 20b, 20c is configured to intersect with the other support portion 21 when viewed from the rotation axis direction.

When the two brush units 20b, 20c are attached to the bracket 30, one (for example, the left side) brush unit 20b is disposed on the bracket 30, and then the other (for example, the right side) brush unit 20c is disposed on the bracket 30. When the commutator 6 or the like does not come into contact with the brushes 25, that is, when no force is applied to the support portions 21 in the radial direction of the motor 1, the support portions 21 of the two brush units 20b, 20c intersect with each other when viewed from the front-rear direction. In the present embodiment, as shown in FIGS. 8 and 9, the brushes 25 overlap each other in the front-rear direction. Thereafter, by displacing both the brushes 25 outward in the radial direction of the motor 1 by using a jig or the like, a state where the two brushes 25 overlap each other in the front-rear direction can be released, so that the attachment portions 24c at the tip end sides of the brushes 25 can overlap each other in the front-rear direction, as shown in FIGS. 10 and 11. When the attachment portions 24c overlap each other in the front-rear direction in this manner, a process of smoothly deforming the support portions 21 of the two brush units 20b, 20c and bringing the commutator 6 into contact with both the brushes 25 can be efficiently performed.

In the present embodiment, a position of one brush 25 of the two brushes 25 is different from a position of the other brush 25 in the rotation axis direction of the motor. Specifically, the brush 25 of the brush unit 20c on the right side is positioned on the front side of the brush 25 of the brush unit 20*b* on the left side. In the rotation axis direction, the two brushes 25 may be at the same position.

Figure 12:
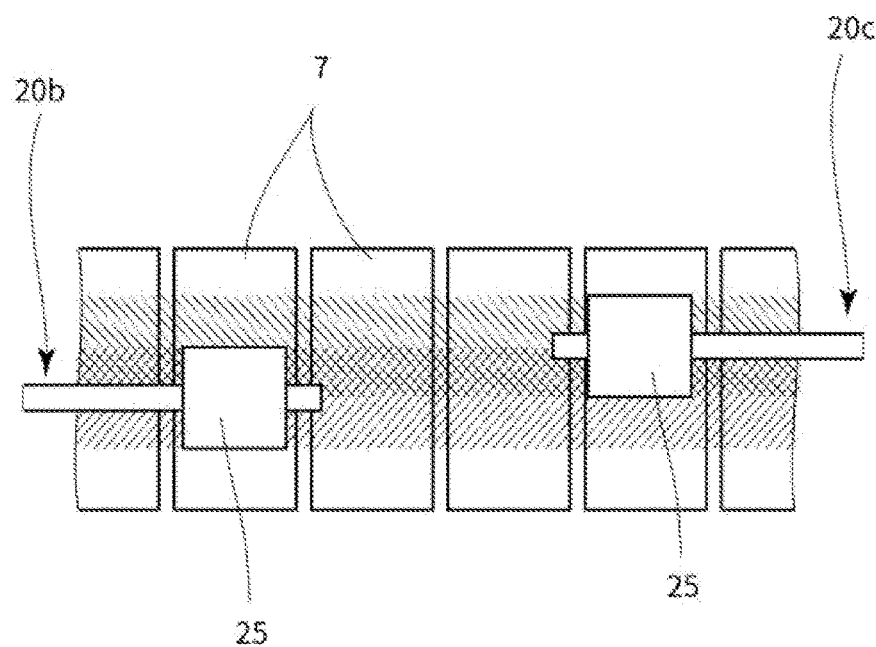
FIG. 12 is a view for explaining a positional relationship between two brushes and a commutator in a front-rear direction.
Figure 12:
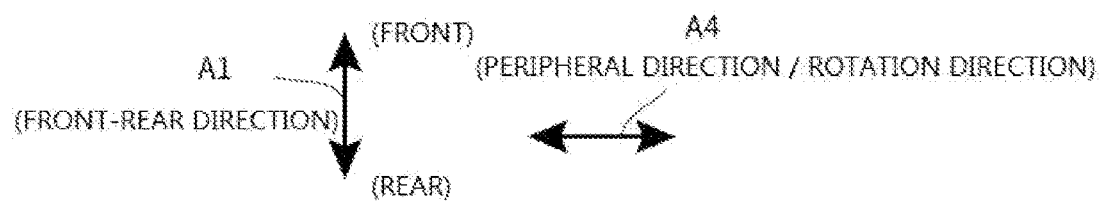

FIG. 12 is a view for explaining a positional relationship between the two brushes 25 and the commutator 6 in the front-rear direction.

In FIG. 12, for the purpose of explanation, a portion of the commutator 6 is developed on a plane in the peripheral direction, and the positional relationship between the two brushes 25 and the commutator 6 is schematically shown. An arrow A4 indicates a peripheral direction of the commutator 6.

As shown in FIG. 12, in the present embodiment, the brush 25 of the brush unit 20*c* on the right side is slightly located on a front side of the brush 25 of the brush unit 20*b* on the left side. Therefore, in the front-rear direction, a region (in FIG. 12, a region indicated by left-upward hatching) of the commutator 6 which comes into contact with the brush 25 on the right side and a region (in FIG. 12, a region indicated by right-upward hatching) of the commutator 6 which comes into contact with the brush 25 on the left side are shifted in the front-rear direction. A portion where the two regions overlap is narrower in area than that in a case where both brushes 25 are at the same position in the front-rear direction. Therefore, even if the brushes 25 are worn by the rotation of motor 1, the abrasion powder is dispersed in a relatively wide area, so that the abrasion powder is less likely to be accumulated between the adjacent commutator segments 7, and a problem such as a short circuit is less likely to occur.

As described above, in the present embodiment, since the columnar brushes 25 are used, a structure in which the commutator 6 appropriately come into contact with the brushes 25 can be achieved even in the motor 1 in which a width of the frame 10 is 10 millimeters or less. Since each of the support portions 21 forms a torsion spring and a length of the second extending portion 24 can be ensured to be relatively long, a force for bringing the brush 25 into contact with the commutator 6 can be stably ensured. An amount by which the force of bringing the brushes 25 into contact with the commutator 6 changes with the wear of the brushes 25 can be reduced.

Since each of the brushes 25 is the carbon brush and can come into contact with the commutator 6 without using a liquid lubricant, the motor 1 can be used even in a low-temperature environment.

The annular magnet 50 is used. Therefore, a variation in torque can be reduced as compared with a motor in which four magnets are disposed at four corners of the frame. In addition, in a case where a large current flows through the brushes 25 to the commutator 6, resonance can be prevented from being occurred, and generation of the abnormal noise can be reduced.

[Others]

In the above-described embodiment, some of the features may not be provided, or some of the features may be configured in another aspect.

An outer peripheral shape of the motor may not be a square shape as in the above-described embodiment. For example, a brush unit as described above may be used in a small-sized motor having a so-called elliptic (an oval shape formed by connecting two left and right circular arcs and two straight lines) cross section, or a brush unit as described above may also be used in a small-sized motor having a round cross section.

In the motor, the number of brush units and the number of brushes are not limited to two, and may be more than two.

One brush of a plurality of brushes is the brush as described above, and others may be another form of brush.

A motor includes a frame having an inner surface; a plurality of magnets attached to the inner surface of the frame; a bracket provided at the frame; a columnar brush formed of carbon and having an outer peripheral surface; a commutator which comes into contact with the outer peripheral surface of the brush; and an elastic member which supports the brush to the bracket. The magnets of the plurality of magnets are disposed side by side in a peripheral direction, and the elastic member is inside the brush. In applications requiring high torque, the motor is required to be reduced in size. In order to output a drive force for the high torque in a small-sized motor, a large current can flow through the motor. In addition, since an interval between the adjacent commutators is relatively narrow, occurrence of a short circuit due to accumulation of abrasion powder of the brush between the adjacent commutators can be suppressed.

A motor includes a frame having an inner surface; a magnet attached to the inner surface of the frame; a bracket provided at the frame, a plurality of columnar brushes formed of carbon, each of the brushes having an outer peripheral surface; a commutator which comes into contact with at least one outer peripheral surface of the brushes, and an elastic member which supports the brushes to the bracket. The elastic member is inside the brush, and a position of one of the brushes is different from positions of other brushes in a rotation axis direction. Accordingly, since an interval between the adjacent commutators is relatively narrow, occurrence of a short circuit due to accumulation of abrasion powder of the brush between the adjacent commutators can be suppressed.

When the first extending portion of the support portion is fixed to the terminal portion, in a case where it is difficult to join a member forming the first extending portion and a member forming the terminal portion by welding, soldering may be used for fixing the members. When it is difficult to fix a small-sized motor having a width of, for example, 10 millimeters or less, by welding, the motor may be fixed by soldering.

In particular, in a case where a high current is applied to the motor to obtain a high torque, a contact resistance at a joined portion joined by welding may be relatively high. Therefore, it may be difficult to obtain a high torque even when a high current is applied. In this case, by soldering, the contact resistance at the jointed portion decreases, which may result in obtaining a desired high torque. Therefore, the support portion having the first extending portion and the terminal portion may be fixed by soldering, or the brush and the metal wire forming the coil portion may also be fixed by soldering.

The number of turns of the metal wire forming the coil portion needs to be determined by considering contact pressure generated by contact between the commutator and the brush. In the present embodiment, the number of turns of the metal wire is four, but is not limited thereto, it may be increased or decreased, and can be appropriately determined by considering the contact pressure, the length of the extending portion, and a thickness of the metal wire.

The coil portion is press-fitted into the protruding portion provided at the bracket, so that the coil portion may be positioned in a winding direction of the metal wire. The coil portion is positioned by the protruding portion in the winding direction of the metal wire, so that the contact pressure between the commutator and the brush can be adjusted. For example, in a case where a space cannot be ensured within the motor, in a case where the number of turns of the metal wire cannot be increased, or in a case where the thickness of the metal wire cannot be increased, such that the total height of the motor cannot be increased in the rotation axis direction, the contact pressure between the commutator and the brush can be adjusted by positioning the coil portion. In addition, an angle of the bent portion of the support portion can be adjusted by increasing or decreasing the angle of the bent portion, if necessary. Alternatively, by setting a position of the bent portion of the support portion closer to the brush with respect to an intermediate position having the same length from both end portions of the support portion, or closer to the coil portion, the contact pressure can be adjusted by changing a spring constant of the support portion.

The motor configured as described above can be used in various applications. For example, the present disclosure may be applied to electronic equipment, or may be used for applications mounted on various vehicles.

It should be understood that the above-described embodiments are merely illustrated in all respect and not restrictive. The scope of the present disclosure is defined by the claims rather than the description described above, and is intended to include all modifications within the scope and meaning equivalent to the claims.

What is claimed is:

1. A motor comprising:
    a rotation axis;
    a frame;
    an annular magnet attached to the inner surface of the frame;
    a bracket provided at the frame, the bracket comprising an outer peripheral portion, a recess portion inside the outer peripheral portion, a protruding portion and a wall portion, the protruding portion and the wall portion being arranged at the recess portion;
    a columnar brush having an outer peripheral surface;
    a commutator contacting the outer peripheral surface of the brush;
    a terminal portion; and
    an elastic member supporting the brush at the bracket, wherein:
    the elastic member includes a first extending portion, a second extending portion and a coil portion between the first extending portion and the second extending portion,
    a part of the second extending portion of the elastic member is inside the brush,
    the first extending portion is fixed to the terminal portion, the wall portion is arranged between a part of the columnar brush contacting the commutator and a part of the first extending portion fixed to the terminal portion from the first extending portion toward the second extending portion,
    the protruding portion is arranged inside the coil portion, the outer peripheral surface of the brush is cylindrical in shape,
    the second extending portion of the elastic member penetrates through the brush in an axial direction of the columnar brush, and
    the wall portion includes a surface facing the columnar brush across space around a central axis of the coil portion.

2. The motor according to claim 1, wherein the frame has a width of 10 millimeters or less and has an inner surface, the width being a distance between a pair of portions of the inner surface opposing across the rotation axis.

3. The motor according to claim 1, wherein the commutator includes a plurality of commutator segments arranged in a peripheral direction, and wherein a width of the outer peripheral surface of the brush is equal to or smaller than a width of one of the commutator segments in the peripheral direction.

4. The motor according to claim 1, wherein the rotation axis defines a rotation axis direction, and wherein the bracket includes an opening portion facing the brush in the rotation axis direction of the motor.

5. The motor according to claim 4, wherein the commutator is disposed at an inner side of the opening portion, and wherein a first part of the opening portion facing the brush, the commutator, and a second part of the opening portion are aligned in a radial direction.

6. The motor according to claim 4, wherein the opening portion has a planar shape having a long side and a short side.

7. The motor according to claim 1, wherein a rib is provided at an outer peripheral surface of the bracket, and wherein the rib contacts the inner surface of the frame.

8. The motor according to claim 1 comprising:
    a plurality of brushes including the columnar brush,
    a plurality of elastic members including the elastic member, and
    wherein a position of a first brush of the brushes is higher than a position of a second brush of the brushes in the rotation axis direction of the motor.

9. The motor according to claim 8, wherein the first brush of the brushes is configured to come into contact with the second brush of the brushes, and wherein a first elastic member of the elastic members, supporting the first brush of the brushes, is configured to intersect with a second elastic member of the elastic members supporting the second brush of the brushes.

10. The motor according to claim 1, wherein the brush comprises carbon.

11. The motor according to claim 1, wherein
    the second extending portion includes a bent portion, and
    the bent portion oppose the wall portion around the central axis of the coil portion.

* * * * *